United States Patent Office 3,005,410
Patented Oct. 24, 1961

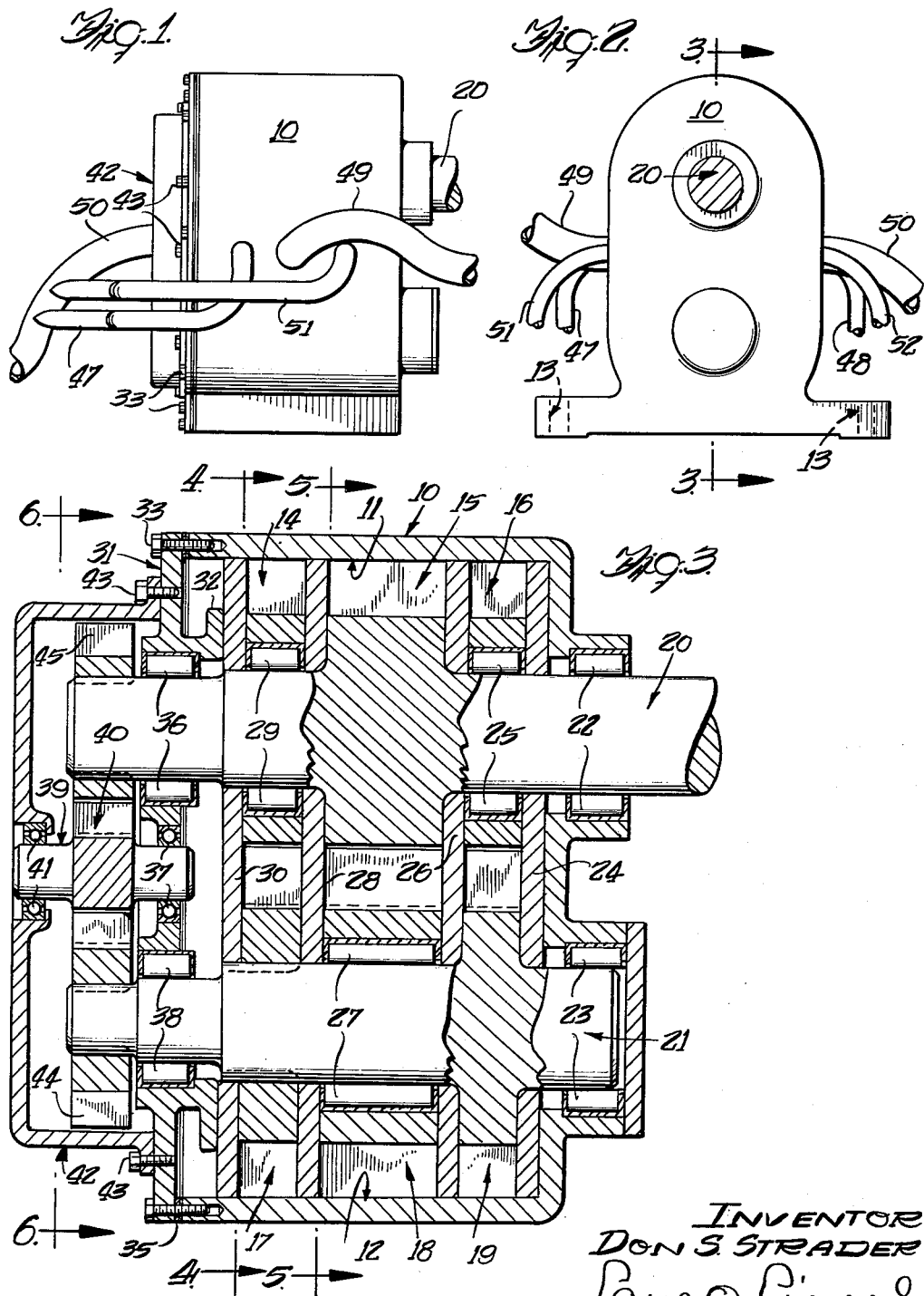

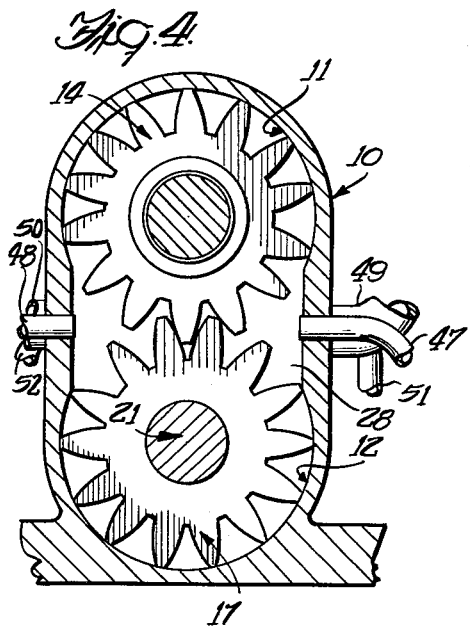
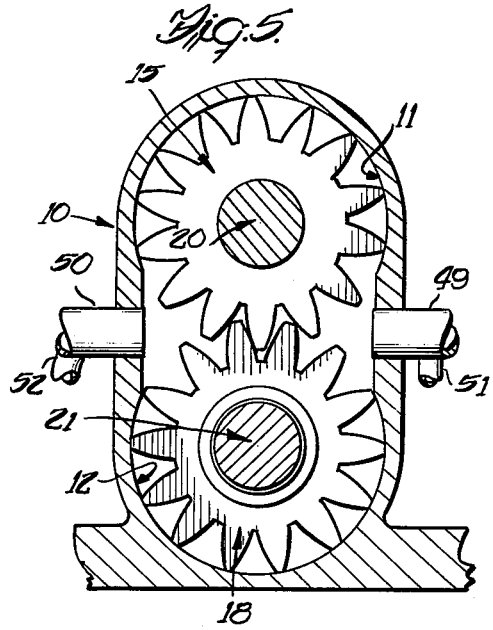
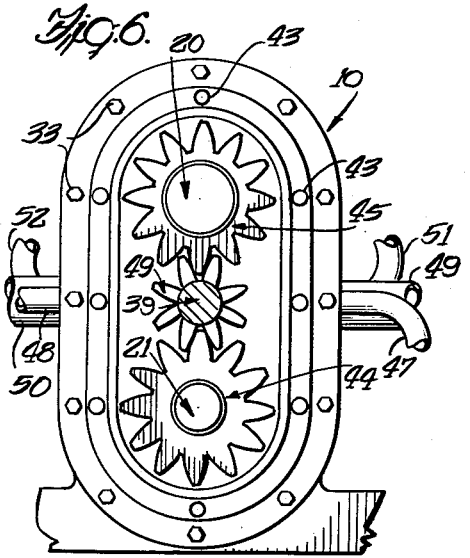
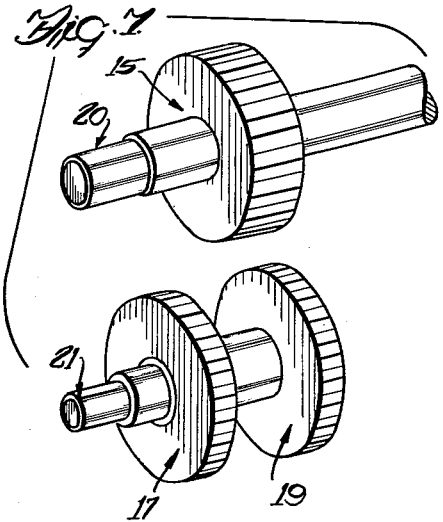

3,005,410
BALANCED GEAR PUMP OR MOTOR
Don S. Strader, Mount Prospect, Ill., assignor to The Frank G. Hough Co., a corporation of Illinois
Filed Oct. 20, 1958, Ser. No. 768,364
9 Claims. (Cl. 103—4)

This invention relates generally to gear pumps or motors and more specifically to an improved gear pump or motor arrangement wherein substantial balance of the loads on the shaft bearings is achieved.

As is known in the art, gear pumps, and the term is herein used to include motors, generally comprise a suitable housing containing a pair of meshed gears with a drive shaft connected to one of the gears to drive that gear while the other gear functions as an idler gear. In use the bearings which support the shafts of these gears are subjected to substantial wear due to the different forces which act upon these gears. Generally the forces acting upon the bearings for the idler gear shaft are substantially greater than the forces acting upon the bearings for the driver gear shaft. Specifically mentioning a few of the forces which act upon these gears, they are generally of two classes, those which are produced mechanically such as the separating forces due to the mechanical meshing of the teeth of the gears and the tangential forces due to the mechanical force with which the various teeth engage the housing, and those which are produced hydraulically such as the hydraulic force produced on the gears and their bearings by the hydraulic fluid pressure on the high side of the pump. There further exists a difference between the theoretical forces upon the bearings of a gear pump and the actual or practically experienced forces which act upon these bearings. The difference results from the actual shape of the gear teeth, the imperfections in sealing of the teeth against the housing surfaces, and the degree of contamination of the hydraulic fluid by dirt or other particles.

Without attempting to state the objects or features of the present invention in terms of the force vectors of the theoretical or practical forces which act upon the bearings of a gear pump, it is the object of the present invention to provide a gear pump arrangement wherein substantially less wearing of the bearing occurs over the amount of wearing presently experienced in the art.

It is a further object of the present invention to provide a gear pump arrangement having multiple driver and idler gears wherein substantial balance is produced of the forces acting upon the bearings of the gear shafts in the operation of the pump.

It is a further object of the present invention to provide a simple gear pump having one power input shaft and a plurality of pump arrangements cooperating to produce substantial balance of the forces on the bearings for the rotating shafts thereof.

It is a further object of the present invention to provide light gear pump construction relative to the hydraulic pressures produced by the pump with a minimum of wear on the shaft bearings thereof.

Other objects and features of the present invention will be apparent from a perusal of the following specification and drawings, of which:

FIG. 1 is a side elevational view of a pump constructed according to the present invention;

FIG. 2 is an end view of the structure shown in FIG. 1;

FIG. 3 is an enlarged cross sectional view of the structure shown in FIGS. 1 and 2 and taken along the line 3—3 of FIG. 2;

FIG. 4 is a reduced cross sectional view taken along the line 4—4 of FIG. 3;

FIG. 5 is a similar cross sectional view taken along the line 5—5 of FIG. 3;

FIG. 6 is a similar view taken along the line 6—6 of FIG. 3; and

FIG. 7 is an isometric view of the drive gears of the pump of the present invention.

The present embodiment is the preferred embodiment, but it is to be understood that changes can be made in the present embodiment by one skilled in the art without departing from the spirit and scope of the present invention.

Generally, the present invention comprises a pump housing having a plurality of pump assemblies carried in the housing in a manner such that the forces on the bearings produced by the pump assemblies operating in one direction balance the forces produced on those bearings by the pump assemblies operating in the other direction, and the present embodiment comprises a pump housing having three pump assemblies operatively carried in the housing in a certain cooperating relationship. The gears of one pump assembly have a width equal to the sum of the widths of the other two pump assemblies. The idler gears of the smaller pump assemblies are journalled on the shaft of and on opposite sides of the driver gear of the larger pump assembly. The idler gear for the larger pump assembly is journalled on the common driving shaft for each of the driver gears of the smaller pump assemblies and is positioned between those driver gears. The driver gears of the smaller pump assemblies are driven from the driver shaft of the larger pump assembly through an idler thereby reversing the direction of rotation of the driver gears of the smaller pump assemblies relative to the direction of rotation of the driver gear of the larger pump assembly. Thus the low pressure side of the smaller pump assemblies is on the opposite side of the pump housing from the low pressure side of the larger pump assembly. The above described arrangement to be described in detail below produces a balanced pump assembly such that the life of the shaft bearings is considerably greater than those of other pumps known in the art wherein the bearings have substantially the same size relative to the capacity of the pump.

For a detailed description of the present embodiment reference is made to the drawings. A casing or housing 10 is provided which is open at one end thereof and internally is formed in a somewhat cylindrical shape as shown at 11 and 12 of FIGS. 4 and 5 for proper cooperation with the driving and idler gears of the pump assembly. The base of the housing 10 is provided with suitable holes 13 for securing the pump in any hydraulic arrangement.

The pump gears of the present embodiment comprise gears 14, 15, 16, 17, 18 and 19. Gear 15 is the driver gear for one pump assembly and gear 18 is its idler gear. Gear 17 is the driver gear for another pump assembly and gear 14 is the idler gear therefor. Gear 19 is another driver gear for the third pump assembly and gear 16 is the idler gear therefor. All of the gears 14 through 19 are of the same diameter and pitch. The width of driver gear 15 is the same as that of the idler gear 18 and each of these gears is of a width which is substantially equal to the sum of the widths of gears 14 and 16. Gears 17 and 19 are of the same width as gears 14 and 16. Driver gear 15 is integrally formed with the drive shaft 20. Driver gear 19 is integrally formed with the shaft 21, and driver gear 17 is splined on the shaft 21. One end of shaft 20 extends through the closed end of housing 10 and is rotatively supported therethrough by bearings 22. One end of the drive shaft 21 is also rotatively supported in the closed end wall of the housing 10 and is rotatively carried at that end by bearings 23.

A bearing plate 24 having two holes therethrough for the drive shafts 20 and 21 is positioned in the housing 10 against the closed end thereof as may be seen in FIG. 3.

The driver gear 19 is so formed on the drive shaft 21 that one side of the driver gear 19 engages the plate 24. The idler gear 16 is rotatively carried on the drive shaft 20 by means of bearings 25 and one side of the idler gear 16 engages the plate 24 and meshes with the driver gear 19. A separator 26 is provided with two suitable holes therethrough for the shafts 20 and 21 and is positioned in the housing 10 in an abutting relationship with the sides of the gears 16 and 19 opposite from those engaged by the plate 24.

The driver gear 15 is formed on the shaft 20 to engage the other side of the separator 26. The idler gear 18 for the driver gear 15 is rotatively carried on the shaft 21 by bearings 27 and is positioned to mesh with gear 15 and engage the separator 26.

Another separator 28 is provided with two openings therethrough for the shafts 20 and 21 and is positioned within the housing 10 against the sides of gears 15 and 18. Driver gear 17, which is splined on shaft 21, abuts separator 28 on the side opposite from that engaging idler gear 18. Idler gear 14 is rotatively carried on the shaft 20 by means of bearings 29 and meshes with driver gear 17. Bearing plate 30, having two openings therethrough for shafts 20 and 21, is positioned thereon in housing 10 in engagement with the sides of gears 14 and 17.

Each of the plates and separators 24, 26, 28 and 30 engages the inner walls 11 and 12 of the housing 10 so that substantially no fluid will flow between the inner walls 11 and 12 of the housing 10 and any of the plate separators 24, 26, 28 and 30. The entire stacked arrangement of the gears and separators is held together in close engagement by the cover plate 31 which is provided with a suitable flange 32 extending into the housing 10. The cover plate 31 is secured over the open end of the housing 10 by means of bolts 33, and proper pressure of the flange 32 against the stacked arrangement of plates, separators and gears is provided by the use of suitable shims 35 positioned between the cover plate 31 and the marginal edge of the open end of the housing 10. The cover plate 31 is provided with three openings therethrough carrying the bearing sets 36, 37 and 38. Bearings 36 are positioned to rotatively support the end of shaft 20 opposite from that supported by bearings 22. Bearings 38 are positioned to rotatively support the end of shaft 21 opposite from that supported by bearings 23. Although the separators of the present embodiment are of the fixed clearance type they may also be of the spring or pressure balanced type.

Bearings 37 of the cover plate 31 rotatively carry one end of a stub shaft 39 upon which is formed a gear 40. The other end of the stub shaft 39 is rotatively carried by bearings 41, and bearings 41 are positioned in a suitable opening in the cover 42 which, in turn, is fastened to the cover plate 31 by means of bolts 43. Gear 40, which is an idler gear, is positioned to mesh with gears 44 and 45. Gear 45 is splined on the end of shaft 20 and gear 44 is splined onto the end of shaft 21. Gears 44 and 45 are of the same size because the gears 14 through 19 all have teeth of the same size and the width of the gear 15 is equal to the sum of the widths of gears 14 and 16. However, gears 44 and 45 may be different in size if the pitch of the teeth and size of the gears 15 and 18 are changed relative to the pitch of the teeth and size of the gears 14, 16, 17 and 19 so that the forces produced on the bearings 22, 23, 36 and 38 by the former balance those produced by the latter.

Thus it may be seen that when drive shaft 20 is rotated by some means connected thereto, the drive gear 15 and the gear 45 are directly rotated thereby. Idler gears 14 and 16 on each side of driver gear 15 will not be directly rotated by shaft 20 since these gears are freely rotatable on the shaft 20. Gear 45 will rotate idler gear 40 in a direction opposite from that in which gear 45 is rotated, and idler gear 40 will in turn rotate gear 44 in the same direction as gear 45 is rotated. Gear 44 will rotate and shaft 21 will directly rotate driver gears 19 and 17. Shaft 21 will not rotate idler gear 18 since idler gear 18 is freely rotatable relative to shaft 21.

Driver gear 15 will rotate idler gear 18 in a direction opposite from that in which shaft 21 and driver gears 17 and 19 are rotated. Driver gears 17 and 19 will rotate the idler gears 14 and 16 respectively in a direction opposite from that in which driver gear 15 is rotated. Since the two smaller pump assemblies are rotated in the opposite direction from the larger pump assembly, the inlet and outlet of the larger pump will be on the opposite sides of the housing 10 from the inlets and outlets of the smaller pump assemblies. The fluid conduits 47 and 48 for the pump assembly comprising driver gear 17 and idler gear 14 are connected through the housing 10 into the high pressure and low pressure areas of the pump assembly. Which conduit specifically is the high pressure fluid conduit will of course depend upon the direction of rotation of the shaft 20. Conduits 49 and 50 for the larger pump assembly comprising driver gear 15 and idler gear 18 are also connected through the housing 10 into the high and low pressure sides of that pump assembly. Conduits 51 and 52 for the pump assembly comprising driver gear 19 and idler gear 16 are also connected through the housing 10 into the high and low pressure areas of that pump assembly. As shown in FIG. 1 the conduits 47 and 51 on one side of the housing 10 are connected into conduit 50 from the opposite side of the housing 10. The same may be done with the conduits 48, 52 and 49 to thereby provide a common input conduit and a common output conduit for the three pump assemblies.

Although no particular direction of rotation has been indicated, it is to be understood that the shaft 20 may be rotated in either direction. Further, although the subject invention has been described as a hydraulic fluid pump, it is further to be understood that it may be used as a hydraulic fluid motor by delivering high pressure hydraulic fluid to the conduits on one side of the housing 10 for the smaller gear assemblies and to the hydraulic conduit on the other side of the housing 10 for the larger gear assembly with appropriate hydraulic fluid flow from the other conduits.

Because of the described arrangement of the subject invention, it is not necessary that the bearings 22, 36, 38 and 23 be as large as previously necessary in the art. Because of the balancing feature of the oppositely disposed and driven gear assemblies cooperating with the shafts 20 and 21, there is a substantial cancellation of the large reaction forces normally produced in a hydraulic pump or motor assembly and consequently substantially little of these reaction forces are transmitted directly to the bearings rotatively carrying the gear assemblies in the pump housing to thereby substantially increase the life of these bearings. Although the present embodiment discloses three pump assemblies it is to be understood that a greater number could be used as long as the forces on the bearings were balanced.

Having described the invention, what is considered new and desired to be protected by Letters Patent is:

1. In a hydraulic fluid pump, a pump housing, a drive shaft rotatively carried through said housing, a pump driver gear fixedly carried on said drive shaft in said housing, a second drive shaft rotatively carried through said housing, a pump idler gear freely rotatively carried on said second drive shaft and meshing with said pump driver gear, a pair of pump driver gears fixedly carried on said second drive shaft on opposite sides of said pump idler gear, a pair of pump idler gears freely rotatively carried on said first drive shaft on opposite sides of said pump driver gear and meshing with said pair of pump driver gears, a plurality of separator plates positioned on each side of said gears to divide each pair of meshed gears into three separate pump assemblies, means connected to the ends of said drive shafts for driving said drive shafts in the same direction, an inlet and an outlet for each of said pump assemblies formed through said housing in respective alignment with the suction and discharge sides of said pump assemblies, means connecting the outlets of said pump assemblies in free fluid communication with each other, each of said gears being formed of substantially the same diameter, and said first pump driver gear being formed of a width substantially equal to the sum of the widths of said pair of pump driver gears.

2. In a hydraulic fluid pump as claimed in claim 1, wherein said means for driving said shafts further drives each of said shafts at substantially the same speed.

3. In a hydraulic fluid pump assembly, a pump housing, a drive shaft, bearing means disposed in opposite walls of said housing for rotatively carrying said drive shaft through said housing, a pump driver gear fixedly carried on said shaft in said housing between said bearings, a second drive shaft, second bearing means disposed in opposite walls of said housing for rotatively carrying said second drive shaft through said housing, a pump idler gear freely rotatively carried on said second shaft in said housing between said second bearing means and meshing with said pump driver gear, a pair of pump driver gears fixedly carried on said second shaft between said second bearing means and on opposite sides of said pump idler gear, a pair of pump idler gears freely rotatively carried on said first drive shaft on opposite sides of said pump driver gear and between said first bearing means and meshing with said pair of said driver gears, a plurality of separator plates positioned on each side of said gears to divide each pair of meshed gears into a separate pump assembly, means connected to the ends of said drive shafts for driving said shafts in the same direction, an inlet and outlet for each of said separate pump assemblies formed through said housing in respective alignment with the suction and discharge sides of said pump assemblies, means connecting the outlets of said pump assemblies in free fluid communication with each other, each of said gears being formed of substantially the same diameter, and said first pump driver gear being formed of a width substantially equal to the sum of the widths of said pair of pump driver gears.

4. In a hydraulic fluid pump assembly as claimed in claim 3, wherein said means for driving said shafts further drives each of said shafts at substantially the same speed.

5. In a hydraulic fluid pump assembly as claimed in claim 3, wherein said means for driving said shafts comprises a mechanical gear train connected between said shafts on the ends thereof projecting outwardly from said housing and said first and second bearing means.

6. In a hydraulic fluid pump assembly as claimed in claim 5, wherein said mechanical gear train comprises a first gear fixedly carried on said first drive shaft, a second gear fixedly carried on said second drive shaft, and a third idler gear rotatively carried on said housing and meshing with said first and second gears.

7. In a hydraulic fluid pump assembly as claimed in claim 6, wherein said first and second gears are of substantially the same size.

8. In a hydraulic fluid pump assembly, a housing having the inner walls thereof formed for cooperation with the teeth of the gears of a gear pump, a first drive shaft, bearing means disposed in opposite walls of said housing for rotatively carrying said drive shaft through said housing, a pump driver gear formed on said drive shaft and positioned substantially centrally in said housing and cooperating with the walls thereof, a second drive shaft, second bearing means disposed in opposite walls of said housing for rotatively carrying said second drive shaft through said housing, a second pump driver gear formed on said second shaft and positioned on one side of said first pump driver gear and cooperating with the walls of said housing, a third pump driver gear splined on said second drive shaft and positioned on the other side of said first pump driver gear and cooperating with the walls of said housing, a first pump idler gear, bearing means disposed on said second drive shaft between said second and third pump driver gears and rotatively carrying said first pump idler gear in cooperation with the walls of said housing and meshing with said first pump driver gear, second and third pump idler gears, fourth and fifth bearing means disposed on said first drive shaft between said first bearing means and on opposite sides of said first pump driver gear and rotatively carrying said second and third pump idler gears in cooperation with the walls of said housing and meshing respectively with said second and third pump driver gears, a plurality of separator plates positioned on each side of said gears to divide each pair of meshed gears into a separate pump assembly, means connected between one end of said first and second drive shafts for driving said second drive shaft from said first drive shaft in the same direction and at the same speed as said first drive shaft is rotated, a fluid inlet and outlet formed through said housing respectively on the suction and discharge sides of each of said pump assemblies, means connecting each of said fluid outlets together in free fluid communication, each of said second and third pump driver gears being formed of a width substantially equal to one-half the width of said first pump driver gear, and each of said second and third pump idler gears being formed of a width substantially equal to one-half the width of said first pump idler gear.

9. In a hydraulic fluid pump assembly as claimed in claim 8, wherein said means for driving said second drive shaft from said first drive shaft comprises a first gear fixedly carried on said one end of said first drive shaft, a second gear of substantially the same diameter fixedly carried on said one end of said second drive shaft, and a third idler gear rotatively carried on said housing and meshing with said first and second gears.

References Cited in the file of this patent

UNITED STATES PATENTS

| | | |
|---|---|---|
| 1,818,768 | Swartwout | Aug. 11, 1931 |
| 2,458,452 | Vanni | Jan. 4, 1949 |

FOREIGN PATENTS

| | | |
|---|---|---|
| 162,128 | Australia | Mar. 23, 1955 |
| 1,100,851 | France | Apr. 13, 1955 |